Aug. 6, 1935.    A. B. WELTY    2,010,120
HARVESTER THRESHER
Filed April 27, 1934    6 Sheets-Sheet 1

Fig. 1.

Inventor
Albert B. Welty
By V. J. Lassagne
Atty.

Aug. 6, 1935.  A. B. WELTY  2,010,120
HARVESTER THRESHER
Filed April 27, 1934   6 Sheets-Sheet 5

Inventor
Albert B. Welty
By V. F. Sprague
Atty.

Aug. 6, 1935.  A. B. WELTY  2,010,120
HARVESTER THRESHER
Filed April 27, 1934  6 Sheets-Sheet 6

Inventor
Albert B. Welty
By
Atty.

Patented Aug. 6, 1935

2,010,120

UNITED STATES PATENT OFFICE 2,010,120

HARVESTER THRESHER

Albert B. Welty, Moline, Ill., assignor to International Harvester Company, a corporation of New Jersey Application April 27, 1934, Serial No. 722,657

34 Claims. (Cl. 56—122)

The invention relates to improvements in harvester threshers of the type in which the harvester part is bodily detached and mounted on a special wheel support for transporting the machine with a much reduced width to facilitate its movement through narrow places.

Such machines embody a thresher part and a harvester part or header platform, normally disposed transversely thereof, which results in a combined machine having considerable overall width. The harvester part is flexibly associated with the thresher part for cutting over irregular ground contour, while the platform portion of the harvester is resiliently sprung to make manual adjustment thereof easy to cut various heights of grain encountered in the cutting operation. These spring counterbalances are under a predetermined tension and are of considerable length, the tension and length resulting in an awkward handling problem when the harvester part is removed from the thresher part, when preparing the machine for transport through narrow places. Another problem in preparing the machine for transport results in the mechanism to be employed in carrying the detached harvester part during transport.

With these problems in mind, the invention more particularly relates to an improved form of spring counterbalance and transport means for harvester parts of harvester threshers.

The object of the invention is to provide means for retaining the counterbalance spring mechanism under tension when disconnecting the same preparatory to removal of the harvester part for narrowing the width of the machine for transport.

Another object is generally to improve the connection of the harvester to the thresher and particularly that portion thereof relating to the mounting of these counterbalancing spring mechanisms.

Still another object of the invention is to provide an improved wheel truck support for carrying the disconnected harvester in transport relation to the thresher.

Other objects of the invention will become apparent to those skilled in the art as the disclosure is more fully made.

Briefly, such objects are attained in providing an improved upright support on the thresher adjacent its flexible connection with the harvester, said support serving as a means of connecting substantially vertically disposed counterbalance springs of predetermined tension between the support and the harvester, said counterbalance being removable bodily with the harvester from the thresher, there being means to lock the springs in their given tension before they are disconnected. Thus, the spring assembly can be disconnected from or be attached to the thresher part, or to the support mentioned, in a facile manner, which overcomes the former troublesome method of handling these strong springs. Further, the harvester support or axle is specially formed to receive an auxiliary axle and wheel supports to carry the detached harvester in transport, said structure embodying certain parts for facilitating the mounting of the special wheels that are to carry the platform, or harvester part. So much will suffice for the present in giving a general view of the structure, which is illustrated in detail in the accompanying sheets of drawings, wherein:

Figure 1:
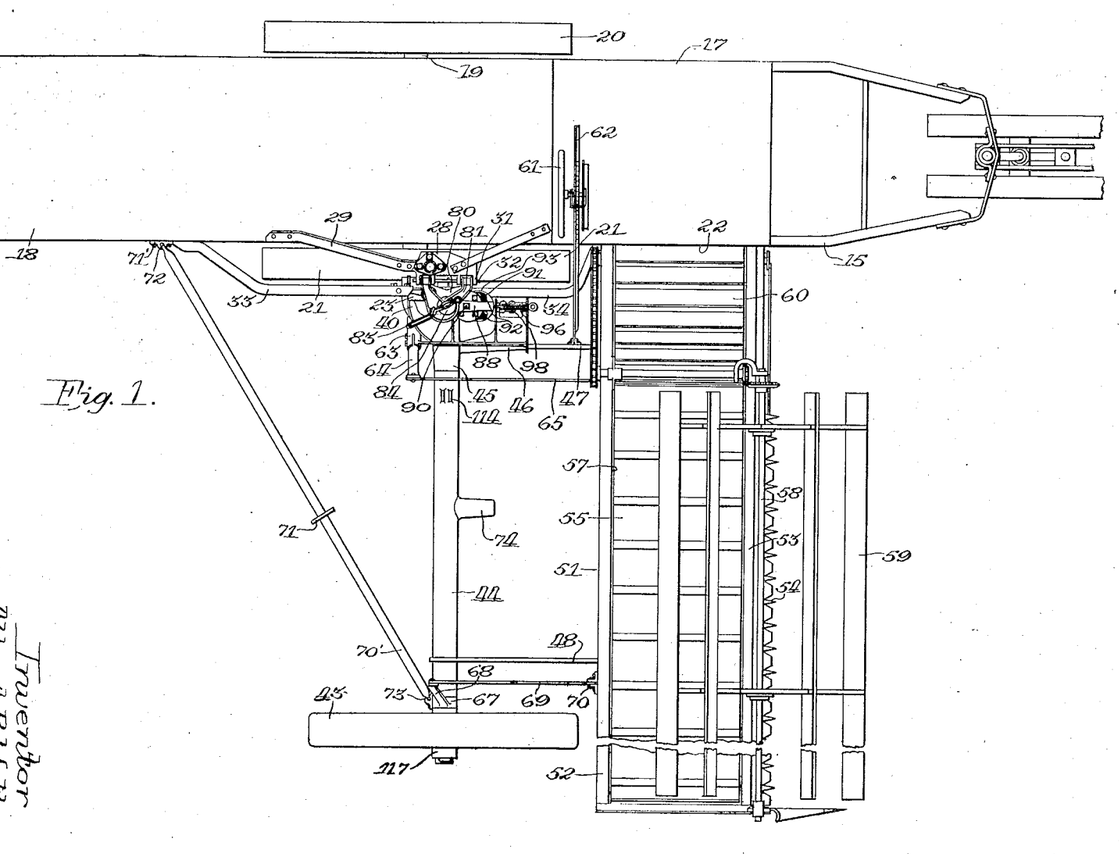
Figure 1 is a general plan view of the harvester thresher showing the harvester in its normal cutting or attached position with respect to the thresher part thereof.
Figure 2:
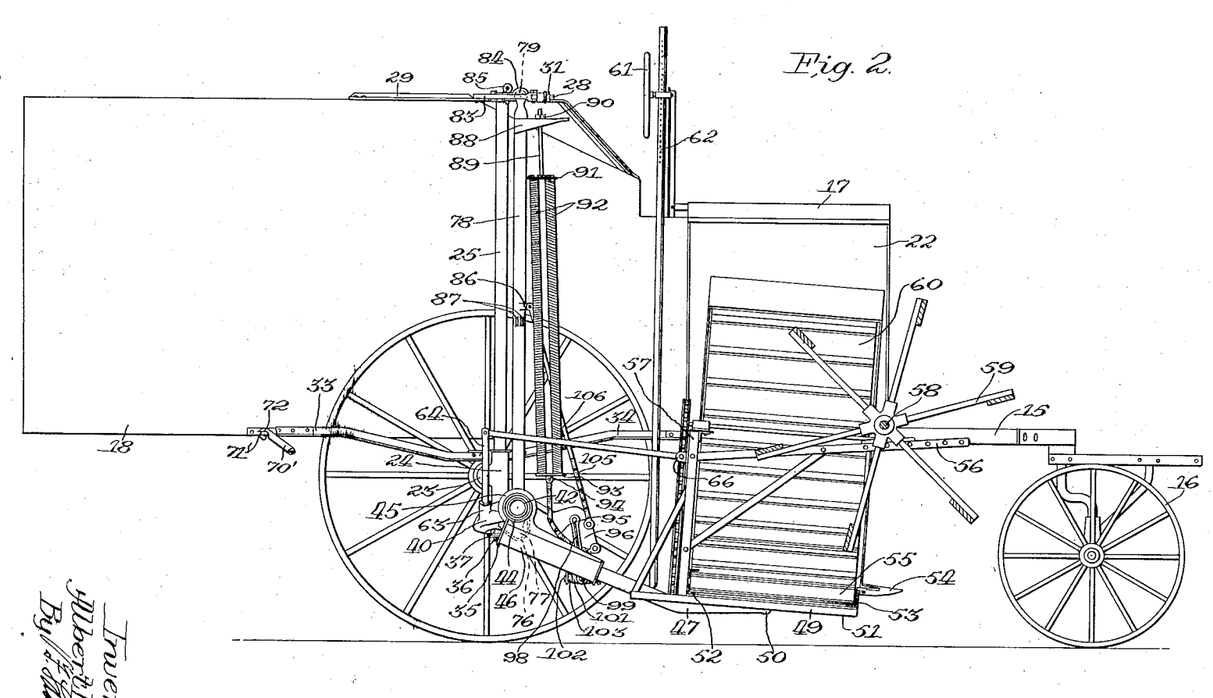
Figure 2 is a general side elevational view of the harvester thresher looking from the grainward side, with the outer end of the harvester cut off, better to illustrate the improvements.

As shown best in Figures 1 and 2, the harvester thresher comprises a longitudinally disposed main frame 15 having its front end supported on a steering wheel truck 16. The forward portion of the frame carries the usual feeder housing 17, to the rear of which is disposed the thresher or separator housing 18. This much of the machine described comprises the main portion of the thresher part, and it is supported on a transverse axle 19 carried in a pair of wheels 20, 21. The grainward face of the feeder housing 17 is open, as at 22, for a purpose later to appear.

Figures 3, 4:
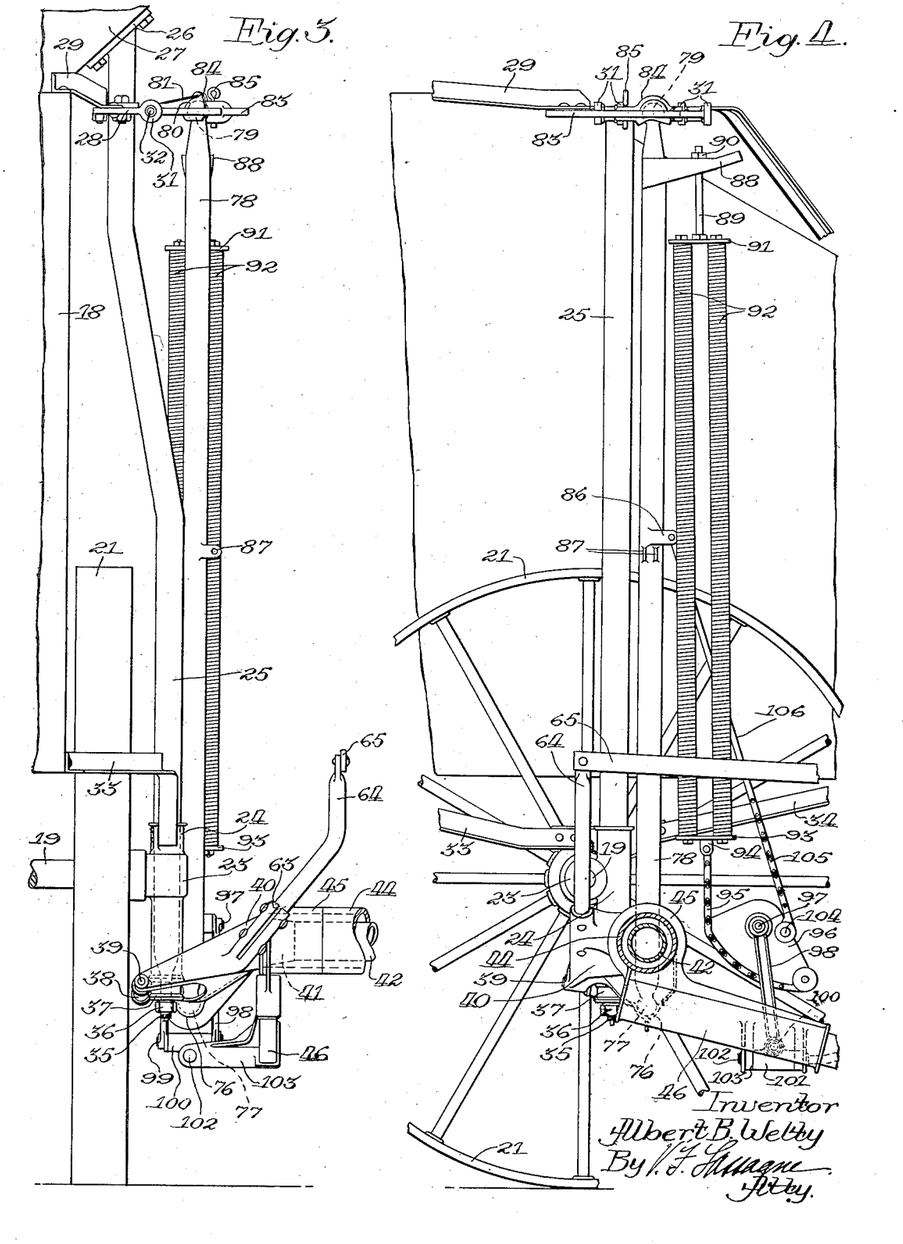
Figure 3 is an enlarged detail rear elevation view of the connection between the thresher and harvester parts and further clearly showing the counterbalance spring mechanism.
Figure 4 is a side elevational view, looking from the grainward side, of the parts shown in Figure 3, and on the same scale.

For the purpose of connecting the harvester part, next to be described, to the thresher, the end of the axle 19, as best seen in Figures 3 and 4, is projected a distance grainwardly of the wheel 21. A sleeve 23 is appropriately anchored on said axle extension, said sleeve including a vertical, forwardly offset, sleeve portion 24, which is extended upwardly a short distance above the axle 19, and downwardly of the axle a relatively longer distance, as shown, to provide a long bearing that receives an upright standard 25 carried by and extending upwardly alongside the thresher body 18 to a point adjacent the top thereof. The top end of this standard, as shown only in Figure 3, terminates in a bracket 26 for supporting the overhanging part of a grain storage tank 27 carried in an appropriate manner on the top of the thresher.

Figures 5, 6, 7:
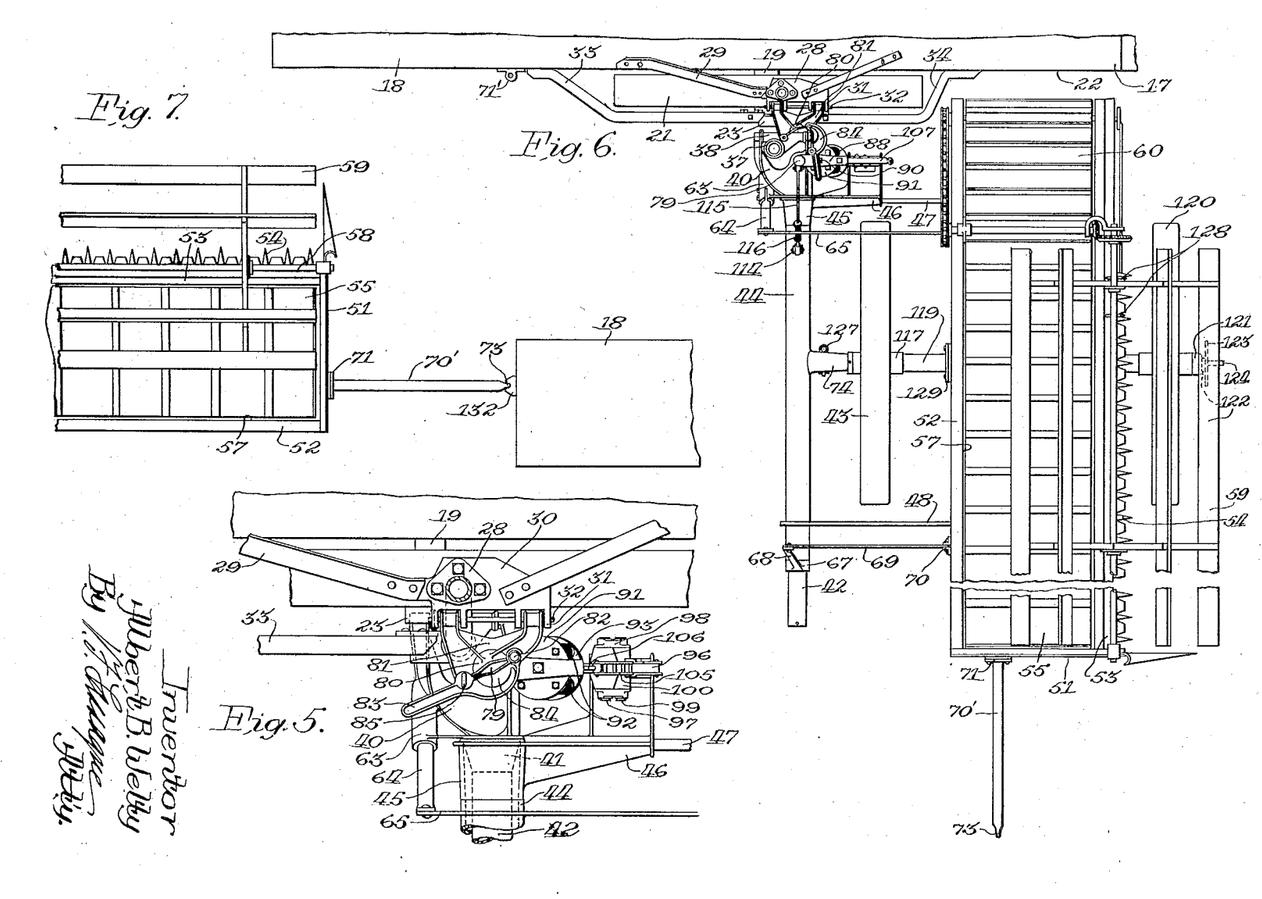
Figure 5 is a plan view showing the structure of Figure 4.
Figure 6 is a general plan view showing the counterbalance disconnected from the thresher part with the spring lock in place, the view also showing the platform on its special wheel truck and a draft element in position ready to draw the disconnected harvester away from the thresher part.
Figure 7 is a plan view to show how the draft element is connected to the thresher part for trailing the disconnected harvester part therebehind during the transport movement.

The upper end of this standard 25, which is vertically disposed, has fixed to it a member comprising a collar portion 28, between which, and the thresher 18, a suitable brace 29 is connected, as shown best in Figure 5. Formed with said collar portion 28 is a horizontally disposed plate portion 30 having a pair of spaced, longitudinally aligned ears 31 carrying a hinge pin 32 for a purpose later to appear. A brace 33 ties the front end of the plate 30 to the thresher body. In this fashion the upper end of the standard 25 is held securely on the thresher part. The lower end of the standard 25 is steadied by a pair of braces 33, 34 appropriately connected between ears on the sleeve 24 and fore and aft points along the lower edge of the thresher, as shown in Figure 2. The manner of flexibly connecting the harvester to the thresher will next be described.

The lower end of the standard 25 is drawn out to form a narrow, threaded shank 35, as seen best in Figure 3, said shank protruding out below the lower end of the sleeve 24, where a nut 36 is threaded to the shank 35 to hold a collar 37 clamped tightly against the lower end of the standard. Said collar, facing the thresher part, includes a downwardly and forwardly sloped integral sleeve 38 carrying a hinge pin 39 for pivotally connecting to the collar 37 a relatively large bifurcated bracket 40, the legs of which span or embrace the lower end of the standard 25 (see also Figure 6) to connect to the ends of said hinge pin 39.

The grainward end of the bracket is formed with an extension 41, which is butt-welded to a non-rotatable harvester axle 42. The axle 42 is transversely disposed and has its outer, or grainward, end carried in a grain wheel 43. The connecting structure just described is such that the axle 42 is offset forwardly and downwardly of the axis of the thresher axle 19, as appears in Figure 4. The harvester support proper is a torque sleeve or pipe 44, which surrounds the dead axle 42 and is mounted rockingly thereon at its inner end by a sleeve bearing 45 welded to the torque pipe 44, said sleeve 45 abutting the grainward end of the yoked casting 40. The hinge 39, it can now be seen, permits the axle 42 to float, that is hingedly rise and fall, as the grain wheel 43 travels over ground slopes. The harvester header will next be described.

The bearing sleeve 45 includes an integrally formed, forwardly extending arm or bracket 46, which rigidly carries the rear portion of a forwardly extending inner line lever 47. At its outer end, the torque harvester support has secured to it, just inside the wheel 43, another or outer line lever 48. These two line levers 47 and 48, as shown in Figure 2, are pivotally attached to the frame members 49, at 50, of a rectangular harvester platform 51 delineated by the usual rear transverse angle bar 52, and the front transverse Z-bar 53. The Z-bar carries the usual cutting mechanism exemplified by the finger guards 54. The usual conveyer 55 operates over the platform and a framework 56 is carried by a backboard 57 to support the harvester reel shaft 58, in turn carrying and operating the harvester reel 59. The inner or stubbleward end of the platform structure carries the usual upwardly and stubblewardly inclined elevator or spout conveyer structure 60, which receives the cut grain from the platform conveyer 55 to move the same into the feed housing 17, said elevator 60 being detachably connected in any usual way to the feed house 17 to permit the same to discharge the elevated grain through the opening 22 into the said feed house 17.

For the purpose of adjusting the platform up or down to alter the height of cut, a tiller wheel 61 is mounted on top of the thresher body, as shown in Figures 1 and 2, said wheel operating a substantially vertically disposed lift rack bar 62, which has its lower end connected to the line lever 47. The back edge of the casting 40 is formed with a pinch bind 63 for securely gripping an upwardly and grainwardly inclined arm 64 to the upper end of which is pivotally connected a forwardly extending link 65, which has its front end pivotally connected to the harvester backboard at 66. Similarly, as shown in Figures 1 and 6, the outer end of the axle 42 has secured to it a sleeve 67, which carries a stationary upright arm 68 corresponding to the arm 64. Pivotally connected to the upper end of the arm 68 is a forwardly extending link 69 pivoted at its front end at 70 to the backboard 57. As the platform is pivotally carried on the line levers at 50, these links 65, 69 act as parallel ruler links to cause the platform to remain at all times substantially horizontal during its adjustments by the hand operated tiller wheel 61 and lift element 62.

A diagonal brace bar 70' is connected detachably at one end to the thresher at 71' and also detachably connected at its other end to the sleeve 67 of the dead axle 42, as shown in Figure 1. This is the normal position of the brace when the machine is cutting and its purpose is to hold the harvester in the normal transverse position. When the harvester part is detached from the thresher for transport, this brace 70' is removed and connected to the underside of the platform to act as a draft tongue, as will later appear (see Figure 9), said brace 70' having an apertured collar 71 formed thereon for use when the brace is converted to use as a draft element. Further, the ends of the member 70 are hook-shaped, as at 72 and 73, to facilitate its use for the purpose mentioned, as will subsequently better be made known. Another feature to be employed in the transport of the harvester part is the provision of a short sleeve 74 formed on the torque pipe harvester support 44 and extending forwardly from a point intermediate the ends thereof, as appears best in Figure 1.

When the harvester platform is adjusted by the operator, who uses the tiller wheel 61 for that purpose, a counterbalancing mechanism is operative to assist such movement of the platform. Such counterbalance is a spring device and will next be described.

The coupling casting 40, as shown in Figures 3 and 4, is extended forwardly and has formed therein a socket 76 in which is seated the ball-shaped lower end 77 of a vertical post 78, said post being of a length to bring its upper ball-shaped end 79 into engagement with half a ball socket 80 formed in the edge of a casting 81, said casting being bifurcated and having its legs pivotally connected to the ends of the hinge pin 32 carried by the plate 30 and heretofore described. The casting 81 carries a vertical hinge pin 82, to which is pivotally connected a lever 83, which lever adjacent its fulcrum is formed with another half ball socket portion 84, the lever 83, when closed, as shown in Figure 5, completing the split socket 80, 84, into which the ball 79 fits. The split socket described is held together by a removable pin 85 which ties the lever 83 to the casting 81.

The pivots 39 and 31 are vertically aligned, and the distance from them to the adjacent balls 77 and 79 is the same, so, in effect, a parallel ruler motion is permitted of the post 78 relative to the standard 25. In other words, the post 78 remains vertical. Midway between its ball ends, the post 78 carries on its front edge a pair of ears 86 and therebelow, at its grainward edge, another pair of ears 87 for a purpose presently to be made known.

Figure 11:
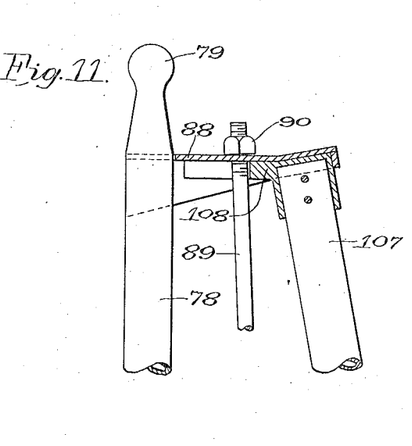
Figure 11 is a detail view, partly in section, to show the upper end of the lock staff for keeping the counterbalance springs in tension when removed; and, Figure 12 is a similar view to Figure 11, but showing the bottom end of this structure.

Adjacent its upper end, the post 78 has firmly secured thereto a forwardly extending bracket 88, which, as shown in Figure 11, is shaped as an inverted channel, through which is passed a threaded rod 89 held in place by a nut 90, as shown. The lower end of the rod 89 is anchored in a header plate 91, to which the ends of a battery of tensioned springs 92 are secured. These springs are quite long and vertically disposed, as shown in Figure 4, and have their lower ends fastened to a lower header plate 93, which on its under side is formed with ears 94, to which is securely fastened a flexible element, such as the chain 95. The chain is trained under the cam surface of a cam plate 96, which is pivotally mounted on a pin 97 at the upper ends of a pair of spaced upright levers 98, the lower ends of said levers, as appears in Figure 3, being pivoted to a pin 99 carried in a transverse sleeve 100. Said sleeve 100 includes a longitudinal sleeve 101 carrying a longitudinal pin 102 for pivotally mounting a transverse bracket 103, which is bifurcated so that its legs connect to the ends of said pin 102, as appears in Figure 4, said legs or bracket 103 being merged with and formed as an integral part of the bracket 46 that carries the line lever or bar 47. The cam 96 carries a pin 104 forwardly of the pin 97, to which pin 104 a chain 105 is connected, said chain continuing with a rod 106 that is passed upwardly and rearwardly between the springs 92 to be connected securely in the ears 86 and to the post 78, as seen in Figure 4.

Figure 8:
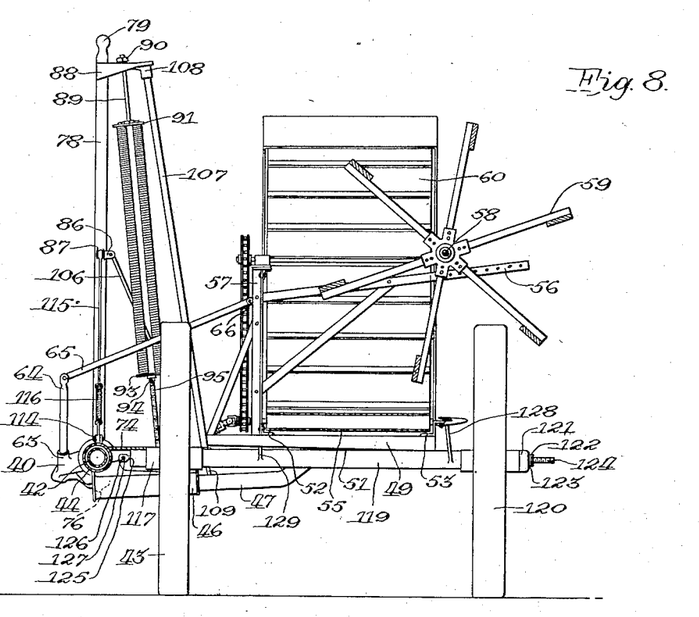
Figure 8 is a rear elevational view of the harvester part seen in transport.
Figure 12:
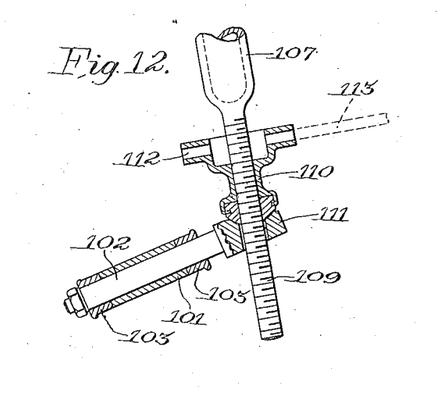

When the harvester is removed from the thresher, the post 78, carrying the springs 92, is removed at its upper end from the split socket 80, 84, but, before doing so, a rigid staff, which normally is no part of the machine, must be brought in and put in place, as will be now described, to prevent loss in tension of the springs 92. This staff, as shown in Figures 8, 11 and 12, appears at 107, it having secured to its upper end a claw piece 108, which is fitted under the channel bracket 88 with the claw thereof embracing the rod 89. The lower end of this staff 107 is reduced and elongated as a threaded shank 109, which is passed through a special form of turn nut 110 resting with its lower spherical end on a spherically recessed rest 111 formed as an integral extension of the pin 102, said shank 109 passing loosely through the rest 111, as shown in Figure 12. The nut 110 is formed with a plurality of holes 112 to receive a suitable form of bar 113 for turning the nut 110, which action causes the staff 107 to be securely and rigidly held between the rest 111 and bracket 88 to positively lock the springs 92 in tension.

With the staff 107 thus in place, the lever 83 is released by taking out the latch pin 85 to free the upper ball end of the post 78 to cause disconnection of the counterbalance spring carrying post from the thresher. Then, between the ears 87 heretofore described, and ears 114 on the torque pipe harvester support 44, a brace or stay rod 115 is connected, said rod including a strong shock or cushion spring insert 116. See Figures 6 and 8.

However, before all this is done, the platform 51 should be raised by the lift 61, 62 to a substantially level or horizontal position. Then, a jack, not shown, is placed under the outer, or grainward, end of the support 44, to raise said support sufficiently to permit taking the grain wheel 43 off the end of the dead axle 42, said wheel being designed with a hub 117 having self-contained, anti-friction bearings 118, so that, when the wheel is removed, the bearings 118 will remain in place and not fall out. See Figure 10.

Next, an auxiliary, light, but strong, tubular axle 119, having a transport wheel 120 at one end, is slid under the platform, transversely of its length, as shown in Figures 6 and 8, the free end of this axle being telescoped into the sleeve 74. Before the axle is slid into the sleeve 74, the removed wheel 43 is placed, as shown in Figure 6, so that the axle 119 can be slid therethrough. The other end of this axle 119 carries a cap 121 in which a nut 122, having turn arms 123, is mounted. The threaded end 124 of a rod 125 passes threadedly through the nut 122. The rod 125 is passed clear through the hollow axle 119 and has its other end formed as a flattened apertured ear 126 adapted to line up with holes through the sleeve 74, so that a pin 127 may be passed through the sleeve 74 and ear 126, to detachably secure these parts together.

Figure 10:
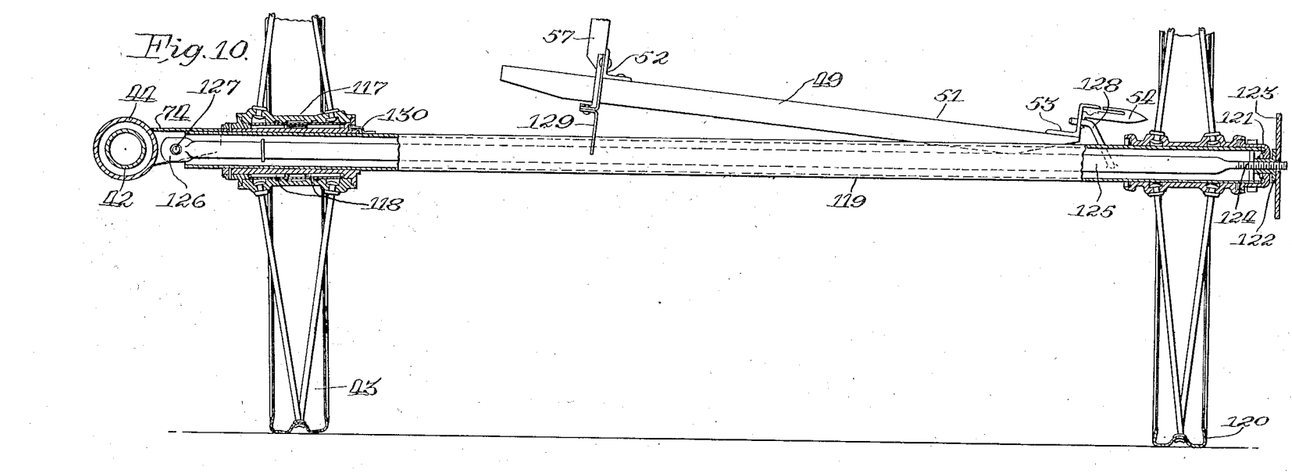
Figure 10 is a part cross-sectional detail view, on an enlarged scale, to show the manner of supporting the detached harvester on the special wheel support attachment.

The axle 119 has welded thereto a pair of diverging upwardly spread apart fork arms 128, which pass through holes in the Z-bar 53 to stabilize the mounting of the platform on the transport axle 119. Further, at its rear, the angle bar 52 of the platform carries a depending saddle member 129, which rests on the axle 119, as shown in Figure 10, further to stabilize the mounting of the platform. Thereafter, the bars 123 are turned to push the wheel 43 all the way home to its proper operating position, this action resulting from the fact that the nut 122 moves in on the thread 124 to push the axle 119 to the left, as viewed in Figure 10, and as a shoulder 130 welded to the pipe 119 is in position, so to move said wheel 43. The jack is then removed from under the support 44, the load now being carried on the transport wheel truck just described.

Figure 9:
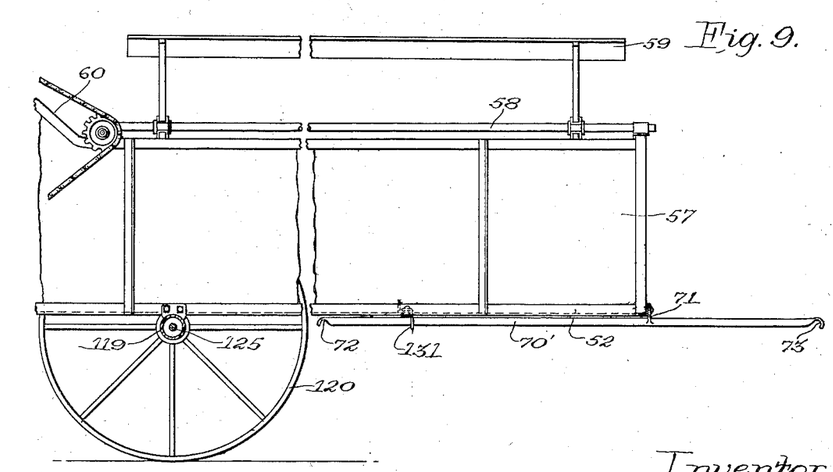
Figure 9 is a side view of the harvester part in transport.

Next, the diagonal brace 70' is uncoupled at its ends from the thresher and harvester axle, and slid, as shown in Figure 9, through an apertured bracket 131 under the platform 51 until the flange 71 abuts the end bar of the platform, as shown, any suitable, detachable securing means being utilized to fasten the brace 70' in place to serve as a draw tongue. This brace or tongue 70' is eventually coupled when the harvester is completely removed to a draw eye 132 at the rear end of the thresher body 18, the hook 73 of the brace now coming into play as a draw hook coupling.

The last step in uncoupling the harvester is to remove the nut 36, allowing the sleeve 37 and its hinged bracket 40 to fall free from the lower end of the support 25.

The normal, or cutting position of the harvester thresher is shown in Figures 1 and 2, where the harvester part is in its transverse position, resulting in a machine too wide to be drawn through narrow places, as over bridges or through gateways. The normal, or operative position of the counterbalance is shown in Figures 3 and 4, where the springs 92 are under the proper tension to balance the weight of the adjustable platform 51. When a field has been cut, it may become necessary to move the machine over roads and through gates to another field, and so it is desirable to reduce the overall width of the machine to prepare the same for such transport. This is accomplished, as has been generally described, by detaching the harvester from the thresher in the manner now to be summed up.

First of all, the platform is raised by the tiller wheel 61 to a substantially horizontal position. A jack is placed under the outer, or grainward, end of the support 44 to permit removal from the axle 42 of the grain wheel 43, which wheel is then placed transversely in the position shown in Figure 6, with its hub approximately in line with the sleeve 74.

The staff 107 is put in place between the bracket 88 and rest 111 to lock the springs 92 in tension. Next, the auxiliary, or transport, axle 119 with its wheel 120 is slid under the platform, as shown in Figure 10, so that the pin 127 can be used to secure the parts, including the rod 125, to the support 44. By means of the take-up bars 123 and nut 122, the axle 119 can be moved into proper position to locate the wheel 43. Also, the prong or fork elements 128 engage the Z-bar 53 to steady the platform on the axle 119. The saddle 129 serves a similar purpose.

The brace 70 is now removed and secured under the platform, as shown in Figure 9, to serve as a draw tongue. The actual detachment of the harvester with its counterbalance intact is accomplished by releasing the upper ball end 79 from its bracket 81 by means of the removable pin 85 and lever 83. The other point of disconnection is made by taking off the nut 36 to free the bracket sleeve 37 from the support 25. The sleeve 37, when thus free, drops from the support 25 to complete the disconnection.

The remaining steps are to disconnect the lift bar 62 from the line lever 47, to which it is connected, and to separate the elevator, or spout, 60 from the feeder house 17. The independently mounted, detached harvester part can now be drawn away on its wheel supports to a position behind the thresher body 18, as shown in Figure 7, where the tongue 70' is coupled to the thresher to enable the detached harvester to be towed in line with and behind the thresher. In this fashion, the transport width of the machine has been materially reduced.

As shown in Figure 8, it will be seen that the reel remains in place on the platform. As the support 78 might have a tendency to whip at its upper end while the harvester is being transported, the cushioned stay brace 115 is connected between the support 44 and member 78 to hold the member against such whipping or vibration.

From this disclosure it will now be appreciated that an improved arrangement of parts is provided to facilitate transport of machines of this type.

It is the intention to cover herein all changes and modifications not departing from the spirit and scope of the invention as defined in the appended claims.

What is claimed is:

1. In a machine having a body, a part detachably connected thereto, means for adjusting the part, a tensioned counterbalance spring structure connected between the body and part, and means to lock the spring structure in tension, said counterbalance being detachable with the part mentioned.

2. In a harvester thresher, a thresher, a harvester detachably and adjustably associated with the thresher, tensioned spring means for counterbalancing the harvester and connected between the thresher and harvester, said harvester and spring means being detachable together as a unit from the thresher, and means to lock the spring means in tension when so removed with the harvester.

3. A machine having a body, an adjustable platform detachably connected thereto, a tensioned spring structure connected between the body and platform and detachable with the platform, and means to lock the spring in tension when so detached.

4. A machine having a body, an adjustable platform detachably connected to the body, a substantially vertically disposed counterbalance spring structure connected between the body and the platform, said spring structure being tensioned and removable with the platform, and a staff to lock the spring structure in tension when removed.

5. A harvester thresher having a thresher, upper and lower brackets at one side of the thresher, a post carried between said brackets, a harvester support connected detachably to the thresher, a harvester platform adjustably connected to the support, a tensioned counterbalance spring connected between the post and platform, and means whereby the spring can be locked in tension, said post and spring being detachable with the harvester support.

6. A harvester thresher having a thresher, upper and lower brackets hingedly mounted at one side of the thresher, a vertical post carried at its ends in the brackets, a harvester support detachably connected to the thresher, a harvester platform adjustably connected to the support, a tensioned counterbalance spring connected between the upper end of the post and platform, and means whereby the spring can be locked in tension, said part and spring being detachable with the harvester support.

7. A harvester thresher having a thresher, upper and lower brackets hingedly mounted at one side of the thresher and formed with ball sockets, a vertical post having ball ends carried in the sockets of the brackets, a harvester support detachably connected to the thresher, a harvester platform adjustably connected to the support, and a tensioned counterbalance spring connected between the upper end of the post and platform.

8. A harvester thresher having a thresher, upper and lower brackets hingedly mounted at one side of the thresher and formed with ball sockets, a vertical post having ball ends carried in the sockets of the brackets, a harvester support detachably connected to the thresher, a harvester platform adjustably connected to the support, a tensioned counterbalance spring connected between the upper end of the post and platform, and means whereby the spring can be locked in tension, said post and spring being detachable with the harvester support.

9. A harvester thresher having a body, a standard mounted at one side of the body, a post carried in parallelism with the standard, and a harvester detachably connected to the lower end of the standard.

10. A harvester thresher having a body, a standard at one side of the body, a post carried for slight up and down movement in parallelism with the standard, and a harvester flexibly and detachably connected with the standard.

11. A harvester thresher having a body, a standard at one side of the body, a post carried for slight up and down movement in parallelism with the standard, a harvester detachably connected to the standard, a tensioned counterbalance spring connected between the post and harvester, said post being detachable with the spring and harvester as a unit, and means to lock the spring in tension when the harvester is detached.

12. A harvester thresher having a body, a standard at one side of the body, a post carried for slight up and down movement in parallelism with the standard, a harvester flexibly and detachably connected with the standard, a tensioned counterbalance spring connected between the post and harvester, said post being detachable with the spring and harvester as a unit, and means to lock the spring in tension when the harvester is detached.

13. In a harvester thresher, a body, and a harvester detachably connected thereto by connections, one of which comprises a bracket formed with a split ball retaining socket.

14. In a harvester thresher, a body, a bracket including a ball socket at the side of the body, a harvester detachably connected to the body, a vertical post having a ball seated in the ball socket, a tensioned counterbalance spring connected between the post and harvester, a portion of the ball socket being releasable to free the post therefrom, said harvester being detachable with the post and spring as a unit, and means to lock the spring in tension when the harvester is detached.

15. A harvester thresher comprising a body, a harvester detachably connected thereto including a post, a counterbalance spring connected between the post and harvester, and means for bracing the post against whipping when the harvester is detached.

16. A harvester thresher comprising a body, a harvester including a harvester support detachably connected to the body, a post included in the harvester, a counterbalance spring connected between the post and harvester, and a cushioned brace between the post and support to steady the post when the harvester is detached.

17. In a harvester thresher, a body, a harvester detachably connected to the body, said harvester including a vertical post, a bracket on the post near its upper end, a rod carried in the bracket, a header connected to the rod, a battery of tension springs connected to the header, a header at the other end of the spring, a flexible element connected to the last mentioned header, a rocking member on the harvester to which said flexible element is anchored, and an element connected between the rocking member and post to make the springs operative as a counterbalance for the harvester, said last mentioned element being passed between the springs.

18. In a harvester thresher, a thresher carried on an axle, a standard supported by the thresher and axle, a tank carried on the thresher and partly supported by the standard, and a harvester detachably connected to the standard.

19. In a harvester thresher, a thresher carried on a wheel supported axle, a standard carried on the axle, a bifurcated bracket hingedly connected to the standard, and a harvester including an axle connected to said bifurcated bracket.

20. In a harvester thresher, a thresher supported on an axle, a bracket secured to the grainward end of the axle including a vertical sleeve extended above and below the axle, a vertical standard carried in said sleeve, a collar bracket secured to the lower end of the standard, a bracket hingedly connected to the collar bracket, and a harvester including an axle connected to the bracket hinged to the collar bracket.

21. In a harvester thresher, a thresher supported on an axle, a vertical sleeve on the axle carrying a vertical standard, a bracket hingedly associated with the lower end of the sleeve and standard, said bracket carrying a post in substantial parallelism with the standard, means releasably mounting the upper end of the post to a member associated with the upper end of the standard, a harvester and its support connected to the hinged bracket, and a tensioned counterbalance spring connected between the post and harvester.

22. In a machine of the class described, a body, a harvester unit including a transverse axle detachably connected to the body, said axle including means adapted to receive and support the axle of a transport device for transporting the detached harvester.

23. In a machine of the class described, a body, a harvester unit including a transverse axle detachably connected to the body, said axle including a forwardly extending sleeve adapted to receive the axle of a transport truck for carrying the detached harvester.

24. A three wheel harvester thresher comprising a thresher supported on a pair of wheels, a transverse harvester including its axle detachably connected at one end to the thresher and mounted in a grain wheel at its other end, said axle having means to receive and carry an auxiliary axle preparatory to detaching the same from the thresher, said auxiliary axle being arranged under the harvester and carried in a transport wheel at one end, and its other end adapted to pass through the grain wheel which is removed from the axle.

25. A harvester thresher having a body, a harvester including an axle detachably connected to said body, an auxiliary axle carried in a pair of wheels, said auxiliary axle adapted to be passed under the harvester to carry the same, and means to connect the auxiliary axle to the harvester axle.

26. A harvester thresher having a body, a harvester including an axle detachably connected to said body, an auxiliary axle carried in a pair of wheels, said auxiliary axle adapted to be passed under the harvester to carry the same, means to draw the auxiliary axle in the direction of its axis toward the axle, and means to connect the auxiliary axle detachably to the harvester axle.

27. A harvester thresher having a body, a harvester including a transverse support detachably connected to said body, a sleeve extending forwardly from the support, an auxiliary pipe axle carried in a pair of wheels and passed under the harvester to carry the same, said auxiliary axle fitting telescopically into the support sleeve, and means to secure the auxiliary axle in said sleeve to said support.

28. A harvester thresher having a body, a harvester including a transverse support detachably connected to said body, a sleeve extending forwardly from the support, an auxiliary pipe axle carried in a pair of wheels and passed under the harvester to carry the same, said auxiliary axle fitting telescopically into the support sleeve, means extending through the auxiliary axle and operable to draw the axle into the sleeve, and means to secure the axle to the sleeve.

29. A harvester thresher having a body, a harvester including an axle detachably connected to said body, an auxiliary axle carried in a pair of wheels, said auxiliary axle adapted to be passed under the harvester to carry the same, means to hold the harvester secure on the auxiliary axle, and means to connect the auxiliary axle to the harvester axle.

30. A harvester thresher having a body, a harvester including an axle detachably connected to said body, an auxiliary axle carried in a pair of wheels, said axle adapted to be passed under the harvester to carry the same, means to hold the harvester secure on the auxiliary axle, said means comprising prongs to engage the harvester at spaced points and a saddle element on the harvester resting on the auxiliary axle, and means to connect the auxiliary axle to the harvester axle.

31. A harvester thresher comprising a thresher body, a transverse harvester and its axle carried in a grain wheel, said axle being detachably connected to the body, an auxiliary axle mount on the axle, an auxiliary axle passed under the harvester to carry the same, said grain wheel being removable from the axle and adapted to receive the auxiliary axle to carry one end thereof, a wheel carrying the other end of the auxiliary axle, and means to connect the auxiliary axle to the axle mount.

32. A harvester thresher comprising a thresher body, a transverse harvester and its axle carried in a grain wheel, said grain wheel having a hub provided with self-contained anti-friction bearings, said axle being detachably connected to the body, an auxiliary axle mount on the axle, an auxiliary axle passed under the harvester to carry the same, said grain wheel with its bearings being removable as a self-contained unit from the axle and adapted to receive the auxiliary axle to carry one end thereof, a wheel carrying the other end of the auxiliary axle, and means to connect the auxiliary axle to the axle mount.

33. A harvester thresher comprising a detachable harvester part carried normally on a transverse axle, an auxiliary axle passed under the harvester part at right angles to the transverse axle and detachably connected thereto, and wheels to support the auxiliary axle when the harvester is detached from the thresher.

34. A harvester thresher comprising a detachable harvester part carried normally on a transverse axle structure including a grain wheel, an auxiliary axle passed under the harvester part at right angles to the transverse axle and detachably connected thereto, and a pair of wheels supporting the ends of the auxiliary axle when the harvester is detached, one of said wheels being the grain wheel which has been removed from the harvester axle structure.

ALBERT B. WELTY.